US007876381B2

(12) United States Patent
Kasano

(10) Patent No.: US 7,876,381 B2
(45) Date of Patent: Jan. 25, 2011

(54) TELOP COLLECTING APPARATUS AND TELOP COLLECTING METHOD

(75) Inventor: Koji Kasano, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 22 days.

(21) Appl. No.: 12/495,293

(22) Filed: Jun. 30, 2009

(65) Prior Publication Data

US 2009/0322943 A1 Dec. 31, 2009

(30) Foreign Application Priority Data

Jun. 30, 2008 (JP) ............................... 2008-170971

(51) Int. Cl.
*H04N 7/00* (2006.01)
*H04N 5/445* (2006.01)

(52) U.S. Cl. ................... 348/465; 348/468; 348/461; 348/473; 348/563

(58) Field of Classification Search ................ 348/468, 348/465, 461, 473, 563, 564, 558; 382/229, 382/321; 704/231, 251; 386/95
See application file for complete search history.

(56) References Cited

U.S. PATENT DOCUMENTS

| 7,519,264 | B2 * | 4/2009 | Miyasato et al. ............... 386/52 |
| 2004/0228616 | A1 | 11/2004 | Miyasato et al. | |
| 2008/0118233 | A1 * | 5/2008 | Hiramatsu et al. ........... 386/124 |

FOREIGN PATENT DOCUMENTS

| JP | 09-037181 | 2/1997 |
| JP | 10-108092 | 4/1998 |
| JP | 2005-117584 | 4/2005 |
| JP | 2006-031366 | 2/2006 |
| JP | 2006-186426 | 7/2006 |
| JP | 2007-006454 | 1/2007 |
| JP | 2007-060562 | 3/2007 |

OTHER PUBLICATIONS

Notice of Reasons for Rejection mailed by Japan Patent Office on Oct. 6, 2009 in the corresponding Japanese Patent Application No. 2008-170971.
Explanation of Non-English Language References.

* cited by examiner

*Primary Examiner*—David L Ometz
*Assistant Examiner*—Jean W Désir
(74) *Attorney, Agent, or Firm*—Knobbe, Martens, Olson & Bear LLP

(57) ABSTRACT

According to one embodiment, a telop display system includes an extracting module which extracts a telop region identified as an image of a telop from video image information of a television program, an image analyzing module which performs image analysis related to coordinates, a size, and a color scheme of the telop region extracted by the extracting module, a semantic analyzing module which performs text analysis related to a word class and a meaning of the obtained character string, and a classifying module which classifies the telop on the basis of an analysis result of at least one of the image analysis and the text analysis to accumulate character strings of the telops as items of text information classified in units of categories.

8 Claims, 4 Drawing Sheets

| Genre | Useful category |
|---|---|
| Meal | Meal name, ingredient, cooking method |
| News | Case title, place, key figure |
| Gourmet and shopping | Shop name, name of commodity |
| Music | Song title, singer |
| Trip | Place name, facility name |
| Variety | Topic, corner title |

FIG. 3

| Category | Image ID | Appearance time | Text | Appearance region |
|---|---|---|---|---|
| Ingredient | 000001_1 | 00:00:01 | Pork 80g | (11,12)-(100,50) |
| Cooking method | 000001_2 | 00:00:01 | Thin meat with the back of knife | (150,300)-(400,400) |
| Ingredient | 000010_1 | 00:00:10 | Proper quantity of flour | (12,13)-(100,50) |
| Ingredient | 000020_1 | 00:00:20 | Proper quantity of egg | (10,12)-(99,50) |

FIG. 4

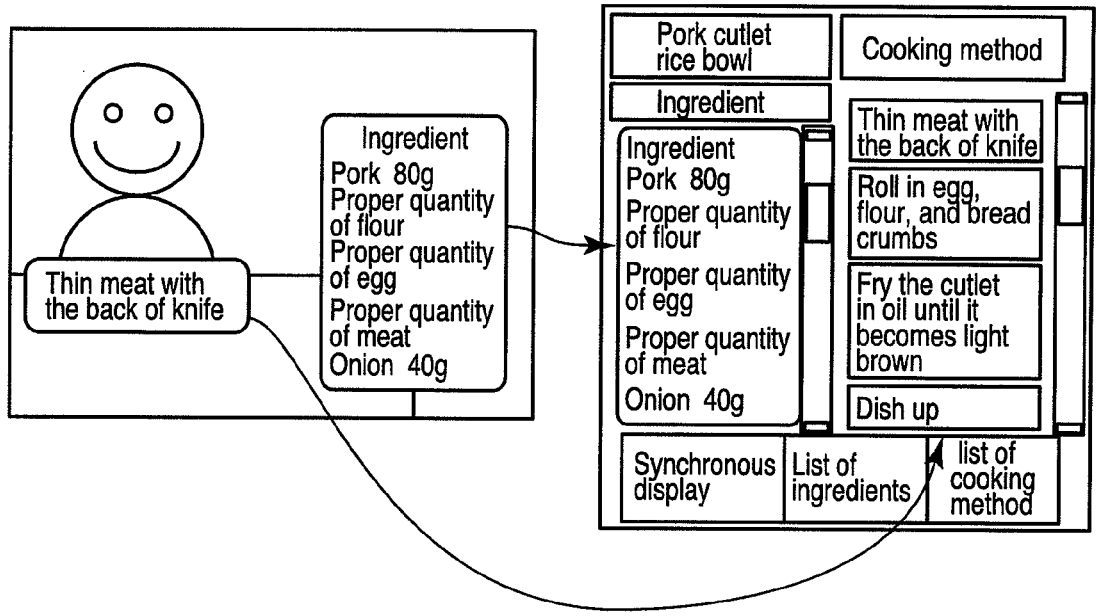
F I G. 5
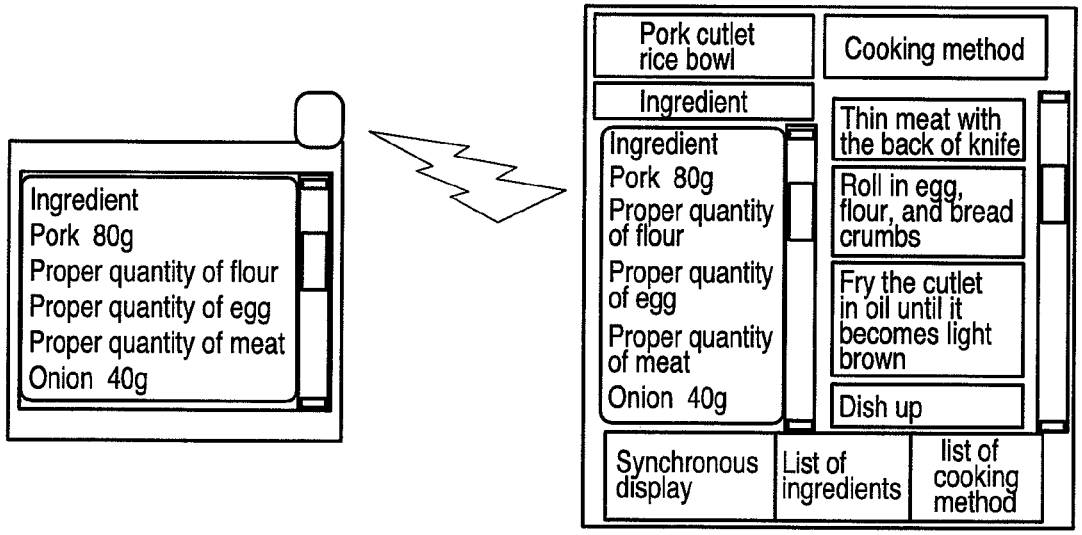
F I G. 6

TELOP COLLECTING APPARATUS AND TELOP COLLECTING METHOD

CROSS-REFERENCE TO RELATED APPLICATIONS

This application is based upon and claims the benefit of priority from Japanese Patent Application No. 2008-170971, filed Jun. 30, 2008, the entire contents of which are incorporated herein by reference.

BACKGROUND

1. Field

An embodiment of the invention relates to a telop collecting apparatus and a telop collecting method which collect a telop incorporated in a video image of a television program in a time-series manner.

2. Description of the Related Art

In video image content of television broadcasting, various telops are broadcast as a part of a program video image. For example, in a news program, titles are sent as telops in units of topics.

As a measure to easily and rapidly recognize content of a recorded image, a conventional technique which collects and displays telops appearing during viewing of a program is known (for example, see Jpn. Pat. Appln. KOKAI Publication No. 2004-364234). This technique estimates a telop serving as a title of each topic on the basis of an interval between scene changes and appearance time of the telop. For example, databases of important words are prepared in units of genres of programs, the database is searched for a character string obtained by character recognition of a telop, and only a telop of a title including a character string useful for a user is provided to the user as a list display.

However, the above technique is not sufficiently considered with respect to handling of a character string except for a character string serving as a title. A large number of telops, other than the title, useful to a user are included in the list.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is a diagram showing an example of category groups provided as a template for television programs of various genres in a telop category classifying module shown in FIG. 1;

FIG. 4 is a diagram showing an example of an accumulation result obtained in the telop category classifying unit shown in FIG. 1;

FIG. 5 is a diagram showing an example of a display obtained in the procedure shown in FIG. 4; and FIG. 6 is a diagram showing an example of a display obtained when a recipe is transmitted from a mail transmitting module shown in FIG. 1 to a mobile telephone by an electronic mail.

DETAILED DESCRIPTION

Figure 1:
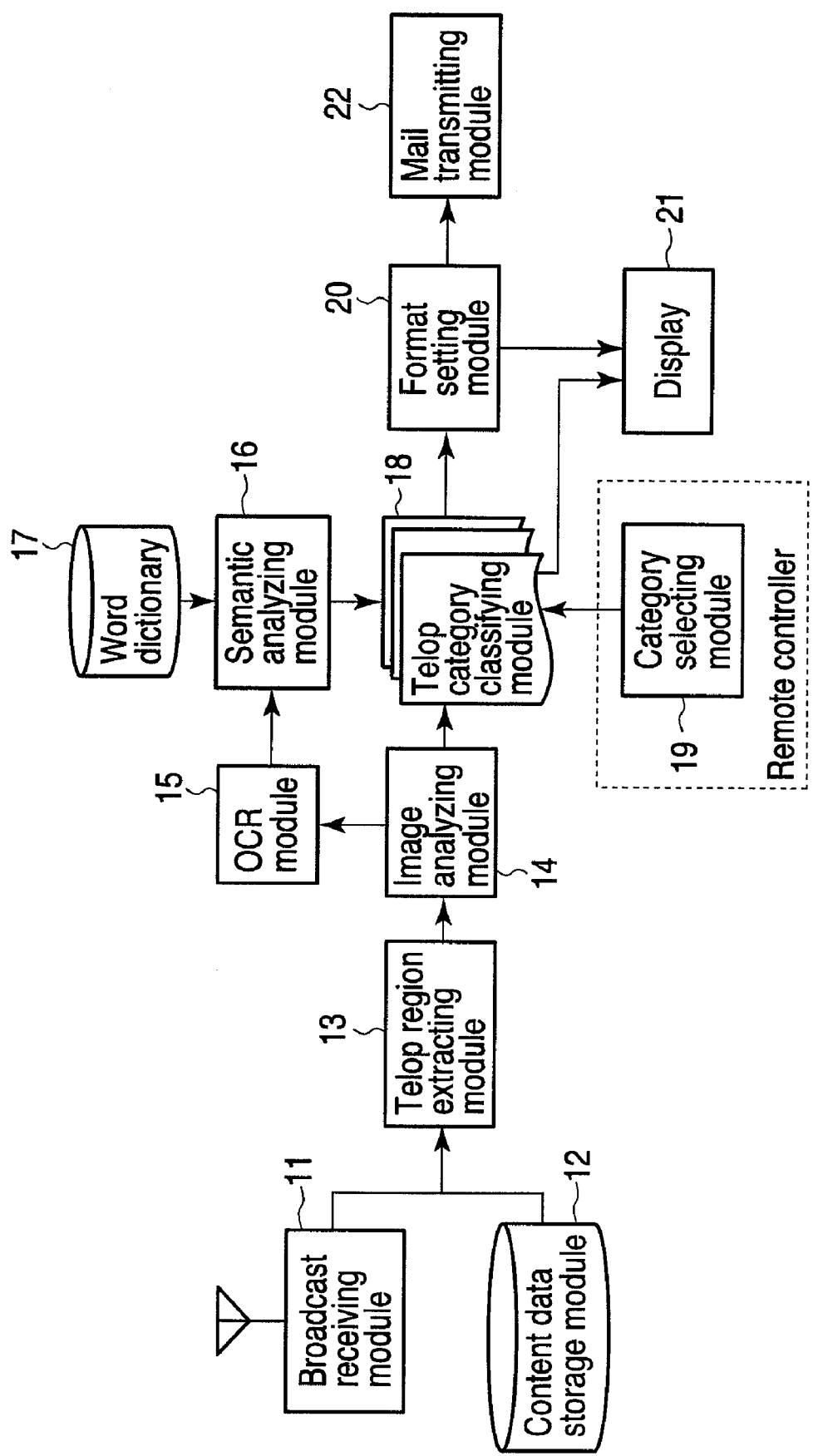
FIG. 1 is an exemplary diagram showing the configuration of a telop display system which collects and displays a telop in a recording/reproducing apparatus according to an embodiment of the invention.

Various embodiments according to the invention will be described hereinafter with reference to the accompanying drawings.

According to one embodiment of the invention, there is provided a telop collecting apparatus comprising: an extracting module configured to extract a telop region identified as an image of a telop from video image information of a television program; an image analyzing module configured to perform image analysis related to coordinates, a size, and a color scheme of the telop region extracted by the extracting module; an OCR module configured to perform character recognition to the telop region to convert an image into a character string; a semantic analyzing module configured to perform text analysis related to a word class and a meaning of the obtained character string; and a classifying module configured to classify the telop on the basis of an analysis result of at least one of the image analysis and the text analysis to accumulate character strings of the telops as items of text information classified in units of categories.

According to one embodiment of the invention, there is provided a telop collecting method comprising: extracting a telop region identified as an image of a telop from video image information of a television program; performing image analysis related to coordinates, a size, and a color scheme of the extracted telop region; performing character recognition to the telop region to convert an image into a character string; performing text analysis related to a word class and a meaning of the obtained character string; and classifying the telop on the basis of an analysis result of at least one of the image analysis and the text analysis to accumulate character strings of the telops as items of text information classified in units of categories.

In the telop collecting apparatus and the telop collecting method, image analysis related to coordinates, a size, and a color scheme of an extracted telop region and character recognition to the telop region are performed to convert characters into a character string. Text analysis related to a word class and a meaning of the obtained character string is performed, the telops are classified on the basis of an analysis result of at least one of the image analysis and the text analysis, and the character strings of the telops are accumulated as items of text information classified by categories. Therefore, collected telops can be organized in units of categories useful to a user. Appropriate classification of telops can be made on the basis of a combination of the image analysis and the text analysis.

The telops organized in units of categories make it possible to easily recognize content of video images, or reuse video image information. For example, in a cookery program, cooking ingredients to be prepared and a cooking method are displayed as telops. When the telops of the cooking ingredients and the cooling method are organized in units of categories and effectively displayed, a user can make a meal presented by the program without reviewing the program from beginning to end. When the information of only the cooking ingredients is transmitted to a mobile telephone, a user can buy the cooking ingredients while viewing the mobile telephone. For this reason, information obtained from a program can be used at a place where a television set is not available.

A recording/reproducing apparatus according to an embodiment of the invention will be described below.

FIG. 1 shows the configuration of a telop display system which collects and displays telops in the recording/reproducing apparatus.

The telop display system includes: a broadcast receiving module 11 which receives a broadcast wave including video image information, audio information, electronic program guide (EPG) information, and the like of a television program transmitted from a digital broadcasting station; a content data storage module 12 which stores moving image program content such as video image information or audio information of a television program obtained from the broadcast receiving module 11; a telop region extracting module 13 which extracts a telop region identified as an image of a telop from the video image information of the television program; an image analyzing module 14 which performs image analysis related to coordinates, a size, and a color scheme (color of character or background) of a telop region and other image characteristics; an OCR (Optical Character Reader) module 15 which performs character recognition to the telop region to convert an image into a character string; a semantic analyzing module 16 which divides the character string obtained as a character recognition result in units of words to perform text analysis related to a word class and a meaning of a word; a word dictionary 17 which holds the meaning of the word and which is referred to by the semantic analyzing module 16 for text analysis; a telop category classifying module 18 which classifies the telop on the basis of at least one of the image analysis results of the image analyzing module 14 and the text analysis result of the semantic analyzing module 16 to accumulate the character string of the telop as text information classified in units of categories; a category selecting module 19 which selects a category having an output format which should be set in the accumulated result in the telop category classifying module 18; a format setting module 20 which organizes the accumulated results in the telop category classifying module 18 corresponding to various telops for each category and sets an output format which can be displayed or printed as a character string or a text image; a display 21 which displays choices obtained from the telop category classifying module 18 for category selection performed by the category selecting module 19 and organizes the accumulation results in the classifying module 18 in units of categories by the output format set by the format setting module 20 to display the accumulated results; and a mail transmitting module 22 which transmits the accumulated result in the classifying module 18 the output format of which is set by the format setting module 20 to an external device by an electronic mail. Electronic program guide (EPG) information can be used to confirm a genre, a performer, and the like of a television program. In the telop category classifying module 18, a memory is arranged to store items of text information classified in units of categories and other information.

In the above telop display system, the broadcast receiving module 11 receives a broadcast wave transmitted from each broadcasting station as a reception signal and decodes the reception signal to acquire program content including video image information, audio information, EPG information, and the like. The program content is stored in the content data storage module 12. The content data storage module 12 stores not only the program content acquired by the broadcast receiving module 11 but also program content acquired from a network or an external storage medium. The telop region extracting module 13 extracts a telop region identified as an image of a telop from video image information of program content output from the broadcast receiving module 11 in real time during program broadcasting or video image information of program content output from the content data storage module 12 in connection with reading of the program content. In this case, the "telop" denotes a character string part having a pixel arrangement stopped for a predetermined period of time in a video image and having such a nature that brightness, chroma, and the like are largely different from those in a near background. The telop region extracting module 13 checks video image information in units of frames. When the telop region extracting module 13 detects a telop region identified as an image of a telop in an image of each frame, the telop region extracting module 13 extracts the telop region and transmits the extraction result to the image analyzing module 14. The extraction result is obtained by adding information of coordinates and appearance time of the telop region to image information of the extracted telop region.

The image analyzing module 14 performs image analysis related to coordinates, a size, and a color scheme such as a background color or a character color of the extracted telop region and sends the image analysis result to the telop category classifying module 18. On the other hand, the OCR module 15 reads a character string by character recognition from the image of the telop region, which image is analyzed by the image analyzing module 14. More specifically, the image of the telop is converted into a character string. The semantic analyzing module 16 divides the character string in units of words by morphological analysis or the like and analyzes the word class of the word and the meaning such as a personal name, a cooking ingredient, or a behavior using the word dictionary 17. The telop category classifying module 18 can use both the text analysis result of the semantic analyzing module 16 and the image analysis result of the image analyzing module 14, classifies telops in the extracted telop region into categories such as a "cooking method", an "ingredient", and a "personal name" for a cooking program or other programs and accumulates the character strings of the telops as items of text information classified in units of categories. The category selecting module 19 is arranged as a category selecting button on a remote controller operated by, for example, a user. When the user selects a category desired to be displayed on the accumulated results in the telop category classifying module 18, text information of a group belonging to a category corresponding to the selection result is sent to the format setting module 20. The format setting module 20 sets an output format predetermined on the basis of a genre of a television program acquired from EPG information to the group of the text information sent from the telop category classifying module 18.

Figure 2:
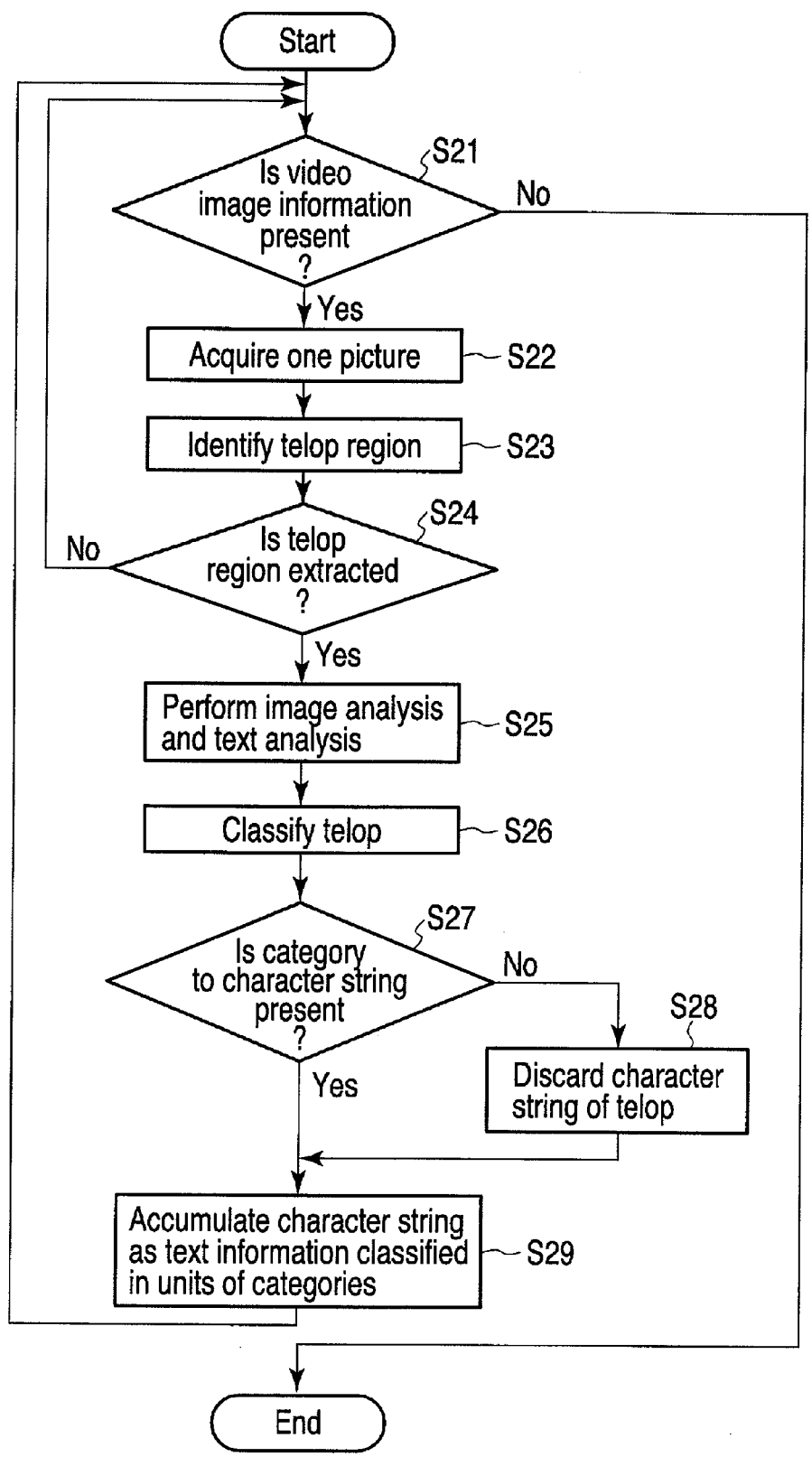
FIG. 2 is a diagram showing an example of a procedure to classify telops in the telop display system shown in FIG. 1.

FIG. 2 shows an example of a procedure to classify telops. The process is started by supplying video image information to the telop region extracting module 13 and performed by using the components 13 to 21. In block S21, it is checked whether video image information is present. If the video image information is present, an I picture (Intra Picture) which can be decoded independently of another frame from the video image information is acquired in block S22, and identification of the telop region is performed on an image frame of the I picture in block S23. In the identification of the telop region, an appearance range of telops is specified by performing image processing such as edge extraction and detection of a region in which changes in color and brightness are small on the basis of characteristics of the telops from the image frame. A background color of the telop region, a color scheme such as a character color, a size, and coordinates are also detected. Subsequently, it is checked in block S24 whether the telop region is extracted according to an identification result. When no telop region is extracted, blocks S21 to S24 are reexecuted to the remaining video image information. When the end of the video image information is detected in block S21, the process to classify telops is ended.

When extraction of one or more telop regions is detected in block S24, image analysis and text analysis in each telop region are performed in block S25, and classification of telops of the telop regions is performed in block S26 on the basis of at least one analysis result of a result of image analysis to a corresponding telop region and a result of text analysis. As a text analyzing method, a semantic analysis method described in, for example, pages 29 to 34 in "Verb Sense Disambiguation Using Co-occurrence on a Thesaurus", "Research Report of Information Processing Society of Japan, Vol. 96 No. 114" (Nov. 18th and 19th, 1996), written by Uchiyama Masao and Itabashi Shuichi and issued by Information Processing Society of Japan, can be used. In next block S27, it is checked whether categories to character strings of the telop regions are present. When some character string does not have a category, the character string is discarded in block S28, the character string having a category is accumulated in block S29 as items of text information classified in units of categories. After execution of block S29, blocks S21 to S29 are executed again.

FIG. 3 shows an example of category groups provided in the telop category classifying module 18 as a template for television programs of various genres. In the above block S27, a genre of a television program is acquired from EPG information, and a category group matched with the genre is acquired with reference to the template. For example, in a cookery program, cooking names, cooking methods, and cooking ingredients are categories useful to a user. In this case, character strings belonging to categories except for the cooking names, the cooking methods, and the cooking ingredients are not regarded to be useful to a user and are not accumulated in the telop category classifying module 18.

FIG. 4 is an example of an accumulation result obtained in the telop category classifying module 18. The telop category classifying module 18 accumulates character strings of telops as items of text information classified in units of categories. However, in fact, as shown in FIG. 4, categories, image IDs, appearance times, character strings, and appearance regions are accumulated together with each other. In this manner, when a category is selected, a character string belonging to the selected category can be specified as a telop to be displayed, and an image of a telop can be specified on the basis of an image ID. In this case, the appearance time can be used to reproduce a scene at the appearance time according to selection of a user. The character string is obtained by character recognition in the OCR module 15. However, when the character string is displayed as an image, the character string is processed or decorated to make it possible to improve the readability of the text.

FIG. 5 shows an example of display obtained by the procedure shown in FIG. 4. For example, when a genre which is a cooking program is fixed for program content held in the content data storage module 12 by using EPG information, an output format for displaying a recipe as shown in FIG. 5 is selected by the format setting module 20. In this manner, text information of a telop belonging to a category of a cooking name, an ingredient, and a cooking method is displayed on the display 21 in this output format.

Even when various telops appear in a time-series manner in a cooking program, a recipe of a list format obtained by organizing the character strings of these telops can be displayed later by a remote control operation as shown in FIG. 5. Therefore, when a user cooks a meal presented by the cooking program, outlines of cooking ingredients to be purchased and a cooking method can be confirmed. In a recipe display, if a character string of a telop is arbitrarily selected, a video image at a time at which the telop appears can be also reproduced. The character string of the telop can be not only used as an index for reproduction but also left as a memorandum or sent to a mobile telephone.

FIG. 6 shows an example of display obtained when a recipe is transmitted from the mail transmitting module 22 to a mobile telephone. When a user goes shopping to cook a meal presented by a cooking program, if the user selects a category of, for example, an ingredient by using the category selecting module 19, items of text information of all telops belonging to the category are transmitted to the format setting module 20. The format setting module 20 sets an output format to the items of text information, and the mail transmitting module 22 transmits the text information obtained from the format setting module 20 to a mobile telephone by an electronic mail. When the user operates the mobile telephone to select the received mail, a list of the ingredients can be displayed. Therefore, the user can do shopping while viewing the list of the ingredients.

In the embodiment, image analysis related to coordinates, a size, and a color scheme of an extracted telop region and text analysis related to a word class and a meaning of a character string obtained by performing character recognition to the telop region and converting the telop region into a character string are performed. A telop is classified on the basis of a analysis result of at least one of the image analysis and the text analysis, and the character string of the telop is accumulated as items of text information classified in units of categories. Therefore, telops to be collected can be organized in units of categories useful to a user. Appropriate classification of telops can be made on the basis of combinations between the image analysis and the text analysis.

More specifically, since only telops of categories important for a user can be collected, content of a television program can be easily recognized. When a large number of telops of various types are incorporated in a video image, as in a conventional art, display obtained by simply listing the telops is often unuseful to the user. In contrast to this, the telop display system according to the embodiment is configured to make it possible to classify telops in a range of a category group suitable for a television program and to select a desired category. In this manner, since results obtained by collecting only telops to which a user wants to pay attention can be displayed as a list, usability is improved.

When text analysis related to a word class and a meaning of a character string obtained by character recognition is to be performed, a user can not only automatically display text information of an analysis result in an useful format for a recipe or the like, but also process and use the text information of the analysis result after the end of broadcasting of the program.

The format setting module 20 may not only set an output format to display text information organized in units of categories, but also set an output format to transmit the text information to a PC to print a recipe. In this manner, various recipes can be formed.

This invention is applicable not only to digital broadcasting, but also to a video image on a network, commercially available package software, or the like.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; further-more, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A caption collecting apparatus comprising:
    an extracting module configured to extract a caption region identified as an image of a caption from video image information;
    an optical character recognition (OCR) module configured to recognize an image of a character string in the caption region and to convert the image into the character string;
    a text analyzer configured to analyze the character string based on a word class and semantics;
    a classifying module configured to classify the caption on the basis of an analysis result from the text analyzer and to accumulate character strings of the captions as items of text information classified by categories;
    a format setting module configured to set an output format in which the captions can be displayed at once for each category according to the genre of the video image information; and
    a display module configured to display the captions in the output format set by the format setting module.

2. The caption collecting apparatus of claim 1, wherein the classifying module comprises a template comprising category groups depending on genres for the video image information, and is configured to discard the character string when the character string does not belong to any one of the category groups in the template.

3. The caption collecting apparatus of claim 1, further comprising a transmitter configured to transmit an accumulation result of the classifying module comprising the output format set by the format setting module to an external device.

4. The caption collecting apparatus of claim 1, further comprising a category selecting module configured to select a category, the output format of the category being set by the format setting module in the accumulation result of the classifying module.

5. A caption collecting method comprising:
    extracting a caption region identified as an image of a caption from video image information comprising a caption;
    optically recognizing an image of a character string in the caption region and to convert the image into the character string;
    analyzing text by analyzing the character string based on a word class and semantics;
    classifying the caption on the basis of an analysis result from the text analysis by accumulating character strings of the captions as items of text information classified by categories;
    setting an output format in which the captions can be displayed at once for each category according to the genre of the video image information; and
    displaying the captions in the output format set.

6. The caption collecting method of claim 5, further comprising:
    setting category groups depending on genres for the video image information in a template; and
    discarding the character string when the character string does not belong to any one of the category groups in the template.

7. The caption collecting method of claim 5, further comprising transmitting an accumulation result comprising the output format to an external device.

8. The caption collecting method of claim 5, further comprising selecting a category, the output format of the category should be set in the accumulation result.

* * * * *